United States Patent

Tsai et al.

[11] Patent Number: 6,099,424
[45] Date of Patent: Aug. 8, 2000

[54] CONTINUOUSLY VARIABLE TRANSMISSION WITH CONTROL ARRANGEMENT AND METHOD FOR RECOVERING FROM TRANSMISSION BELT SLIPPING

[75] Inventors: Shan-Chin Tsai; William G. Durtschi, both of Rockford, Ill.

[73] Assignee: Hamilton Sundstrand Corporation, Rockford, Ill.

[21] Appl. No.: 09/222,952

[22] Filed: Dec. 30, 1998

[51] Int. Cl.$^7$ .......................... F16H 59/00; F16H 61/00; F16H 9/00
[52] U.S. Cl. .................................. 474/12; 474/18; 474/70
[58] Field of Search .................. 474/8, 11, 12, 474/17, 18, 28, 69, 70

[56] References Cited

U.S. PATENT DOCUMENTS

| | | | |
|---|---|---|---|
| 4,729,264 | 3/1988 | Sakai | 74/868 |
| 4,730,522 | 3/1988 | Morimoto | 74/868 |
| 4,734,082 | 3/1988 | Tezuka | 474/28 |
| 4,751,857 | 6/1988 | Saaki | 74/867 |
| 4,771,658 | 9/1988 | Miyawaki | 74/866 |
| 4,798,561 | 1/1989 | Hattori et al. | 474/28 |
| 5,182,968 | 2/1993 | Mott | 741/856 |
| 5,683,318 | 11/1997 | Snel et al. | 474/11 |

*Primary Examiner*—Mary Ann Battista
*Assistant Examiner*—Matthew A. Kaness
*Attorney, Agent, or Firm*—Antonelli Terry Stout & Kraus

[57] ABSTRACT

A continuously variable transmission, and particularly a control arrangement thereof and a method for recovering belt slippage in the transmission, are disclosed. A source of hydraulic pressure is operatively connected for driving each of the hydraulically operated actuators for axially movable sheaves of primary and secondary pulleys of the transmission. A hydraulic pressure control loop controls the hydraulic pressure applied to the actuator of the secondary pulley as a function of the load of the device being driven on the transmission and the pitch radius of the secondary pulley. An output speed control loop controls the output speed of the transmission driving the device to be driven during normal operation of the transmission. Preferably, the output speed control loop may be set to control the output speed at a constant value for driving an aircraft electric generator. A belt speed matching loop overrides the output speed control loop for adjusting the transmission ratio when a condition of belt slipping is detected to recover from belt slipping.

25 Claims, 4 Drawing Sheets

MEASURE GENERATOR LOAD CURRENT $I_L$, GENERATOR SPEED $N_G$ AND LINEAR DISPLACEMENT Y, OF PRIMARY SHEAVE ACTUATOR

CALCULATE GENERATOR TORQUE $TQ_G$ AND PRIMARY PULLEY PITCH RADIUS $R_1$

CALCULATE TORQUE $TQ_O$ AT OUTPUT SHAFT OF SECONDARY PULLEY AND SECONDARY PULLEY PITCH RADIUS $R_2$

CALCULATE SET PRESSURE $P_{SET}$

MULTIPLY CALCULATED $P_{SET}$ BY A FACTOR SUCH AS 1.2 TO PROVIDE MARGIN AGAINST BELT SLIPPAGE

FIG. 3

CONTINUOUSLY VARIABLE TRANSMISSION WITH CONTROL ARRANGEMENT AND METHOD FOR RECOVERING FROM TRANSMISSION BELT SLIPPING

FIELD OF THE INVENTION

The present invention is directed to a continuously variable transmission and, more particularly, to a control arrangement thereof and a method for recovering from belt slippage in the transmission. In a disclosed preferred embodiment, the transmission is used as a constant speed drive for an aircraft electrical power generator.

BACKGROUND AND SUMMARY OF THE INVENTION

The variable pulley transmission, or continuously variable transmission (CVT) as it is commonly called, has been under development for over two decades, but its use as a power transmission is mainly for automotive applications. Its control is rather complicated and is very sensitive to operating conditions. For example, in a control arrangement for a variable pulley transmission disclosed in U.S. Pat. No. 4,458,318, a variable line pressure is controlled and applied to the sheave of the secondary or driven pulley of the transmission, and also serves as the hydraulic power supply to a ratio control valve in a speed control loop of the transmission.

Due to the variable supply pressure in the continuously variable transmission of U.S. Pat. No. 4,458,318, both the pressure control valve (a pressure relief type valve) and the ratio control valve gains change with the supply pressure, and the control is therefore very sensitive to system operating conditions. There is a need for an improved continuously variable transmission with a control arrangement and method for reduction of belt slippage in a continuously variable transmission which overcome these drawbacks and disadvantages of this known continuously variable transmission. More particularly, there is a need for an improved continuously variable transmission with a control arrangement and method which are simpler and more robust than those disclosed in U.S. Pat. No. 4,458,318.

An object of the invention disclosed in the co-pending, commonly assigned U.S. patent application Ser. No. 09/222,958, for CONTINUOUSLY VARIABLE TRANSMISSION WITH CONTROL ARRANGEMENT AND METHOD FOR REDUCING TRANSMISSION BELT SLIPPAGE filed concurrently with this application and hereby incorporated by reference, is to provide a continuously variable transmission with a control arrangement and method which meet this need and which are useful as a constant speed drive for an aircraft electrical power generator wherein belt slippage can be minimized.

In the application of a continuously variable transmission (CVT) as a constant speed drive for electrical power generation, if a large load is suddenly applied, the belt may start to slip. Once the belt starts to slip, due to a change of coefficient of friction between the belt and pulley, the belt will keep slipping and the normal speed control becomes ineffective. A lasting slipping will also cause damage of the belt and pulley. The present invention relates to an improved CVT and method for adjusting the CVT ratio when belt slipping occurs to match the calculated belt speeds at the primary and secondary sheaves so that the normal speed control can be recovered. The invention can be used in combination with the invention of the aforementioned application Ser. No. 09/222,958, or independently.

The continuously variable transmission for transferring drive from an engine to a device to be driven according to the present invention comprises a primary pulley for receiving drive from an engine, a belt, a secondary pulley which is coupled over the belt to the primary pulley for transferring drive to a device to be driven. The primary and secondary pulleys each have an axially movable sheave and a hydraulically operated actuator therefor to effect ratio change of the transmission and to maintain belt tension. A hydraulic pressure control loop controls the hydraulic pressure applied to the actuator of the secondary pulley as a function of the sensed load of the device to be driven on the transmission and the pitch radius of the secondary pulley. An output speed control loop controls the output speed of the transmission driving the device to be driven during normal operation of the transmission. A belt speed matching loop overrides the output speed control loop for adjusting the transmission ratio when a condition of belt slipping occurs to recover from belt slipping.

According to the disclosed embodiment, the belt speed matching loop includes means for detecting a condition of belt slipping in the transmission, and means for adjusting the transmission ratio to recover from the detected belt slipping. The means for detecting a condition of belt slipping estimates the belt speeds at the primary and secondary sheaves and compares the two estimated belt speeds. A condition of belt slipping is indicated when a difference between the two estimated belt speeds exceeds a first predetermined threshold value. The means for detecting measures the primary sheave linear displacement, engine speed and the speed of the device to be driven, and calculates the primary pulley pitch radius and the secondary pulley pitch radius for estimating the belt speeds at the two sheaves in the manner disclosed in more detail hereinafter. More particularly, the means for detecting calculates the estimated belt speed at the primary sheave as a function of the calculated primary pulley pitch radius, the measured engine speed, and an engine side gear ratio, and the estimated belt speed at the secondary sheave is calculated as a function of the calculated secondary pulley pitch radius, the measured speed of the device to be driven, and a device-to-be-driven side gear ratio. The means for adjusting the transmission ratio to recover from belt slipping reduces the difference between the two estimated belt speeds to less than a second predetermined threshold after which normal operation of the output speed of the transmission is resumed by the output speed control loop.

The present invention further includes a method of recovering from belt slippage after the belt starts slipping in a continuously variable transmission for transferring drive from an engine to a device to be driven under varying load conditions. According to the invention, the method comprises detecting a condition of belt slipping in the transmission and adjusting the transmission ratio to recover from belt slipping. In a disclosed form of the invention, the device being driven is an electric generator which is driven at a constant speed by the engine and transmission.

These and other objects, features and advantages of the present invention will become more apparent from the following detailed description of the invention taken with the accompanying drawings depicting a preferred embodiment in accordance with the invention.

BRIEF DESCRIPTION OF DRAWINGS

FIG. 3 is a flow chart of steps of a method for calculating and applying the appropriate pressure to the actuator of the axially movable sheave of the secondary pulley of the continuously variable transmission.

DETAILED DESCRIPTION OF THE DISCLOSED EMBODIMENT

Figure 1:
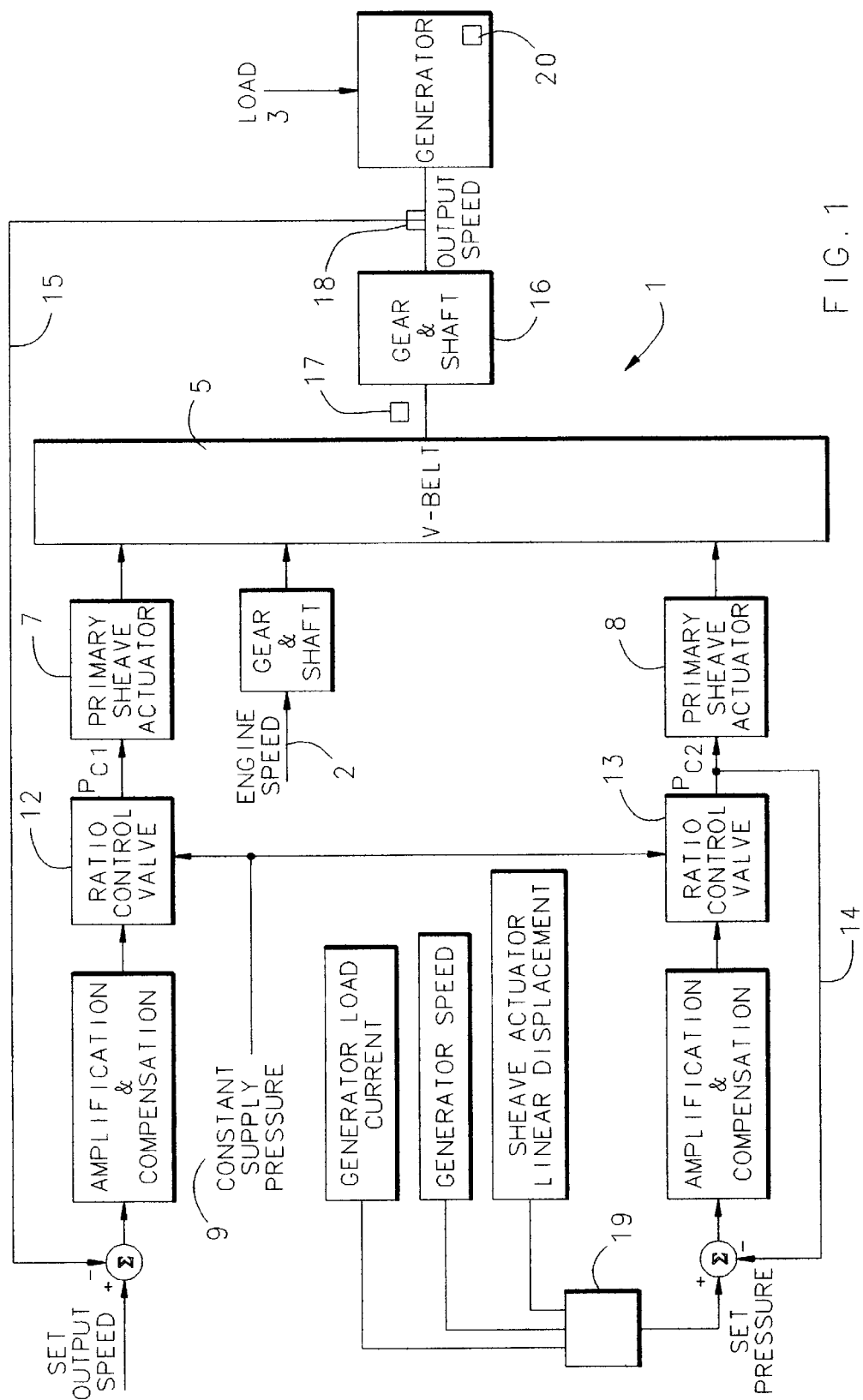
FIG. 1 is a schematic illustration of a continuously variable transmission of the invention including the control arrangement thereof for a variable pulley transmission used as a constant speed drive for an aircraft electric generator.

Referring now to the drawings, FIG. 1 depicts a continuously variable transmission 1 of the invention for transferring drive from an engine 2 to a device 3 to be driven. The transmission 1 comprises a primary pulley 4, shown schematically in FIG. 2, receiving drive from the engine, a belt 5 and a secondary pulley 6 which is coupled over the belt to the primary pulley 4 for transferring drive to the device 3. The primary and secondary pulleys each have a fixed sheave and an axially movable sheave. The positions of the axially movable sheaves are adjustable by respective hydraulically operated actuators 7 and 8 to effect ratio change in the transmission and to maintain belt tension. A single source 9 of constant hydraulic pressure is operatively connected for driving each of the actuators 7 and 8.

Figure 2:
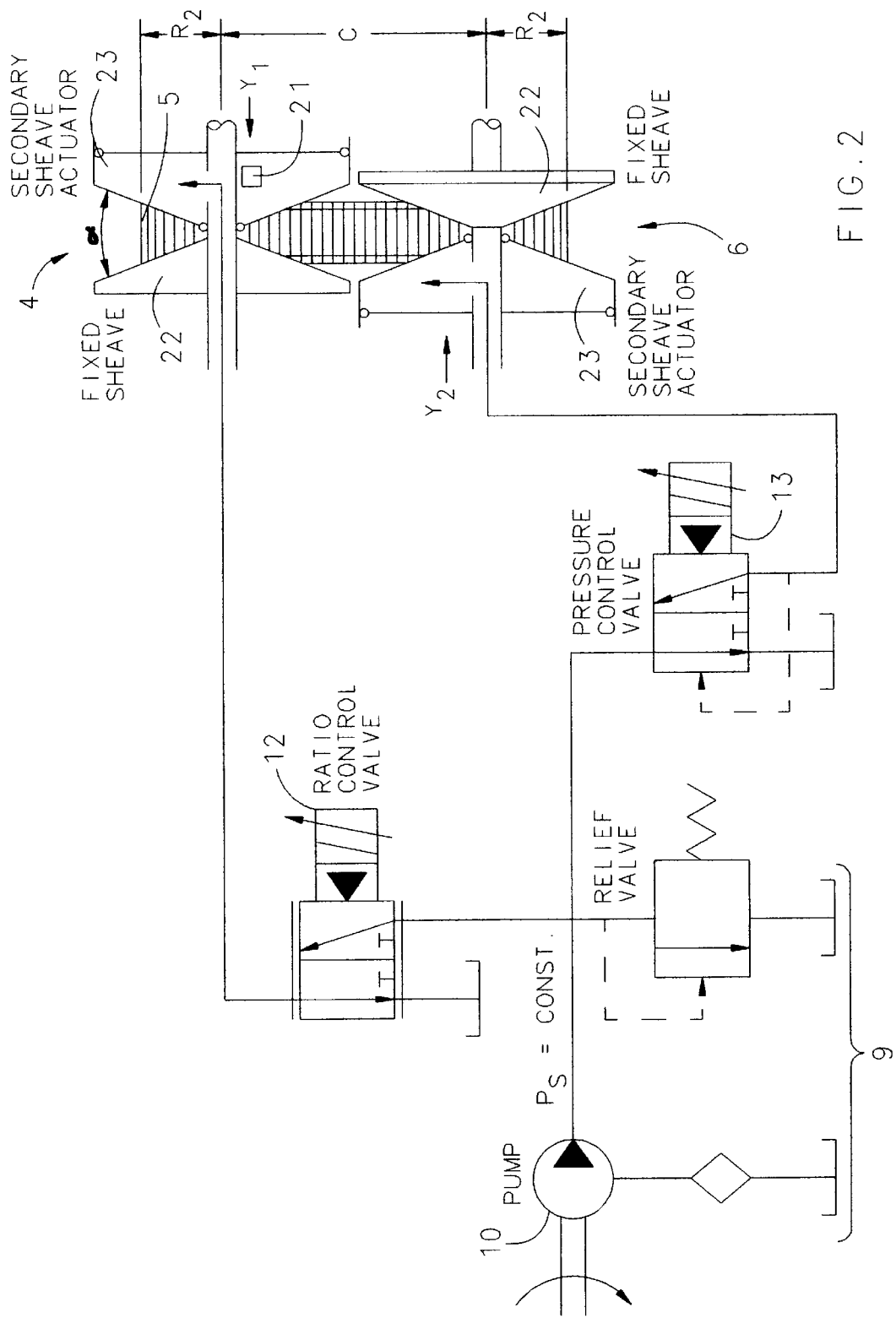
FIG. 2 is a schematic drawing of the continuously variable transmission hydraulic system of the embodiment of FIG. 1.

In the disclosed embodiment, as illustrated in FIG. 2, the source of constant hydraulic pressure 9 comprises a hydraulic pump 10 and a pressure relief valve 11 in communication with the output of the hydraulic pump to maintain a constant predetermined hydraulic output pressure Ps of the pump as denoted at 9 in FIGS. 1 and 2. The single source of constant hydraulic pressure is operatively connected to the primary sheave actuator 7 by way of a ratio control valve 12. The ratio control valve may be a two-stage three-way servovalve of the type disclosed in U.S. Pat. No. 4,458,318, for example. The constant supply pressure 9 is operatively connected to the secondary sheave actuator 8 by way of a pressure control valve 13. The valve 13 is a pressure reducing type valve, preferably an electrohydraulic pressure reducing valve such as an electrically driven proportioning solenoid valve. Reference is made to the co-pending, commonly assigned U.S. patent application Ser. No. 09/222,955 for PRESSURE REDUCING VALVE AND CONTINUOUSLY VARIABLE TRANSMISSION WITH CONTROL ARRANGEMENT USING SAME filed concurrently with this application and hereby incorporated by reference, for a detailed disclosure of a preferred form of the pressure reducing valve although other pressure reducing valves may be used.

For a continuously variable transmission to work properly, it has to be controlled such that, in normal operation, firstly, enough force is applied to the secondary sheave, the driven sheave, to keep the belt from slipping, and secondly, a variable force must be applied to the primary sheave, the driven sheave, to change the transmission ratio according to the requirement of system operation. In the disclosed embodiment, the requirement of system operation is for constant speed drive application for driving device 3, which is an aircraft electrical generator, whereby the transmission output speed must be maintained constant. The electronic-hydraulic control system of the continuously variable transmission 1 in the disclosed embodiment is used to control the above-mentioned two functions.

Figure 4:
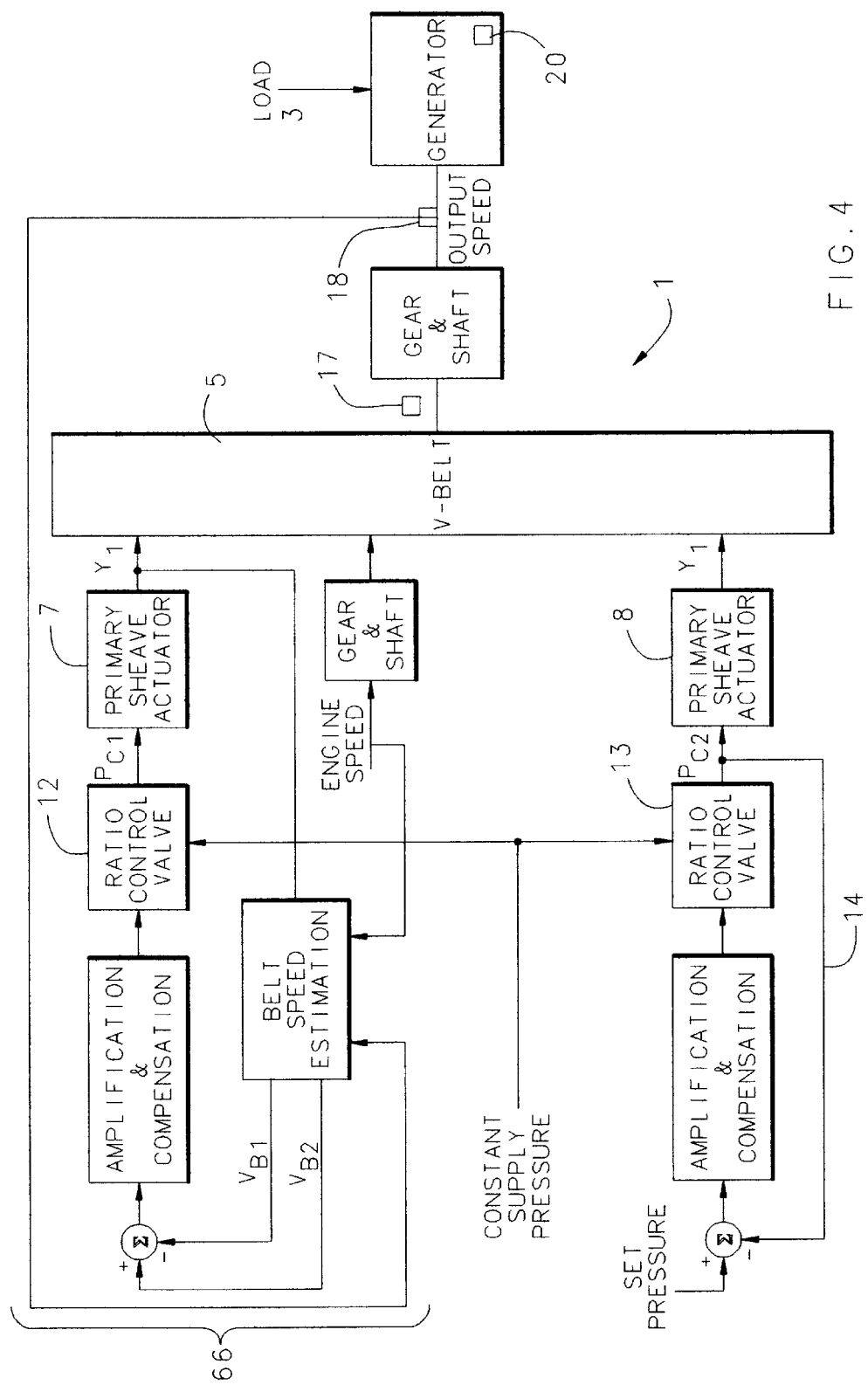
FIG. 4 is a schematic illustration of the belt speed matching control of the CVT of FIGS. 1 and 2 according to the invention.

The control system consists of two main control loops for normal operation of the transmission: a pressure control loop 14 to control the force applied to the secondary sheave by actuator 8 for controlling belt tension, and an output speed control loop 15 for controlling the transmission ratio to maintain the transmission output speed, namely the output shaft speed of the secondary pulley 6, at a constant value under varying engine speed and generator load conditions. This control arrangement of the transmission 1 is simpler and more robust than the previous arrangement in U.S. Pat. No. 4,458,318. Without the constant supply pressure source 9 of the invention, a complicated gain scheduling scheme will be required to compensate for changes in supply pressure that cause belt slippage in the conventional continuously variable transmission. The control system also includes a belt speed matching control loop 66, FIG. 4, which overrides the output speed control loop 15 for adjusting the transmission ratio when a condition of belt slipping occurs to recover from belt slipping as discussed more fully hereinafter.

The force required to be applied to the axially movable sheave of the secondary pulley by actuator 8 to keep the belt 3 from slipping is a function of load torque and the pulley pitch radius. A method for providing sufficient belt clamping force in the continuously variable transmission comprises determining the hydraulic pressure to be applied to the actuator 8 of the secondary pulley to keep the belt from slipping. This determining step includes determining the load torque $TQ_o$ transmitted from the device to be driven to the secondary pulley of the transmission and the pitch radius $r_2$ of the secondary pulley, and calculating a value for the set pressure Pset of the hydraulic pressure control loop to be applied to the actuator 8 of the secondary pulley 6 in accordance with the relationship $$Pset = \left(\frac{TQ_o}{r_2} \cdot \frac{\cos(\alpha/2)}{2\mu}\right) / As$$

where:
$TQ_o$, is the torque on the secondary pulley from the device to be driven
$r_2$ is the secondary pulley pitch radius,
$\alpha$ is the pulley groove angle,
$\mu$ is the coefficient of friction between the belt and the secondary pulley, and
As is the area of the actuator for the sheave of the secondary pulley. The step of determining the load torque transmitted from the generator 3 to the secondary pulley of the continuously pulley variable transmission 1 includes measuring the generator load current $I_L$ with current detector 20, the generator speed $N_G$ with speed sensor 18 and the linear displacement $Y_1$ of the primary sheave actuator 7 using detector 21. From the geometry of the primary pulley 4, its pitch radius of $r_1$ is calculated from the measured sheave actuator displacement $Y_1$. The generator torque $TQ_G$ is calculated given the measurements of $I_L$, $N_G$, and $Y_1$ as set forth below. From the constraint of constant belt length of belt 5 and constant distance between the centers of the two pulleys 4 and 6, the pitch radius $r_2$ of the driven pulley 6 is then calculated using the now known pitch radius $r_1$. Alternatively, the pitch radius $r_2$ could be directly measured using a proximity sensor, for example.

The torque $TQ_o$, at the output shaft of the secondary pulley 6 of the transmission 1 is then calculated as set forth below using the previously calculated generator torque $TQ_G$ and the generator side gear ratio $R_{Go}$ of the gear and shaft unit 16 drivingly connected between the output shaft of the transmission and the generator 3 as depicted in FIG. 1. Using these values, the hydraulic pressure required, $P_{set}$, which serves as the command signal from controller 19 to the pressure control loop 14, is obtained from the calculated force divided by the secondary sheave actuator area $A_s$. The procedure for calculating the set pressure $P_{set}$ for control loop 14 is set forth in the flow diagram of FIG. 3 and described in more detail below.

For load sensing, in addition to or instead of measuring the generator load current $I_L$, a torque sensor 17 mounted on the output shaft of the secondary pulley of the transmission can also be used. This provides an even more direct measurement of the load. Further, instead of measuring the linear displacement of the primary sheave, the displacement of the actuator of the secondary sheave can be measured for determining the pitch radius $r_2$, but there is no need to measure the displacement of both sheaves. To provide some safety margin, the calculated pressure $P_{set}$ is preferably multiplied by a factor of, for example, 1.2 to guard against belt slippage while avoiding undue force on the belt which would shorten the life of the belt and the pulleys. Calculation of the set pressure $P_{set}$ is accomplished by the suitably programmed microprocessor of controller 19, given the measurements of $I_L$, $N_G$ and $Y_1$ and proceeds as follows:

$$Power = 3 \times 115 \times I_L$$

$$TQ_c = \frac{8.8507\ Power}{N_G(\pi/30)}$$

$$TQ_O = TQ_G / R_{GO}$$

$$r_1 = \frac{Y_1}{2\tan(\alpha/2)}$$

$$r_2 = \frac{-(\pi c - 2r_1) + \sqrt{(\pi c - 2r_1)^2 + 4(LC - 2c^2 - \pi r_1 c - r_1^2)}}{2}$$

$$P_{set} = \left(\frac{TQ_o}{r_2} \frac{\cos(\alpha/2)}{2\mu}\right) / A_S$$

where:

$A_s$—secondary sheave actuator area, $in^2$
$\alpha$—pulley groove angle, deg
C—pulley center distance, in
L—belt length, in
$N_G$—generator speed, rpm
$r_1$—primary pulley pitch radius, in
$r_2$—secondary pulley pitch radius, in
$R_{GO}$—generator side gear ratio
Pset—set pressure of the pressure control loop
$TQ_g$—generator torque, in-lbs
$TQ_o$—torque at secondary sheave shaft, in-lbs
$Y_1$—primary sheave actuator linear displacement, in
$\mu$—coefficient of friction In the speed control loop 15, the set speed command signal is a constant, depending on the number of poles of the generator used and is selected to give a 400 cps revolution at the generator shaft. The generator speed is measured by a sensor 18, FIG. 1, and compared with the set output speed command. The sensor 18 also provides a generator speed signal to microprocessor 19. The force difference applied on the primary and secondary sheaves causes the continuously variable transmission ratio to change. Given a force applied on the secondary sheave, the speed control loop 15 will automatically adjust the force applied on the primary sheave to change the transmission ratio by way of ratio control valve 12 to match the generator speed to the speed command.

If a large electrical load is suddenly applied to the generator, the torque generated at the generator will be transmitted almost immediately to the sheaves of the CVT, and if the pressures applied on the sheaves are not large enough, the belt will start to slip. It will take a little while for both the pressure control loop 14 and the speed control loop 15 to respond to the load change, but once the belt starts to slip, it will keep slipping even if the pressures have been increased.

The belt slipping is detected by comparing the estimated belt speeds at the primary and secondary sheaves. A difference of the two estimated belt speeds greater than a first threshold value (say, 0.5 in/sec) indicates that the belt is slipping. Once the slipping is detected, the normal output speed control loop 15 is switched off and the belt speed matching control loop 66 (FIG. 4) is switched on where the two estimated belt speeds are compared and the CVT ratio adjusted automatically to match the two belt speeds. The two belt speeds are considered matched when their difference reduces to a very small second threshold value (say, 0.05 in/sec) and the control is switched back to the normal output speed control loop 15. The measurements of the primary sheave linear displacement, engine speed and generator speed are used to estimate the belt speeds at the two sheaves.

The method to estimate the belt speeds of the primary and secondary sheave of the CVT according to the invention includes the following steps:

Step 1: The engine speed, the generator or output speed, and primary sheave actuator linear displacement are measured.

Step 2: The primary pulley pitch radius and secondary pulley pitch radius are calculated. The primary pulley pitch radius is a function of the primary sheave actuator linear displacement and the pulley groove angle. The secondary pulley pitch radius is a function of the pulley center distance, the primary pulley pitch radius, and the belt length.

Step 3: The estimated belt speed at the primary sheave is calculated as a function of the primary pulley pitch radius, the engine speed, and engine side gear ratio. The estimated belt speed at the secondary sheave is calculated as a function of the secondary pulley pitch radius, the generator or output speed, and the load side gear ratio.

The method is set forth in more detail below.

Estimation of belt speed at primary and secondary sheaves given the measurements of $Y_1$, $N_E$, and $N_G$:

$$r_1 = \frac{Y_1}{2\tan(\alpha/2)}$$

$$r_2 = \frac{-(\pi C - 2r_1) + \sqrt{(\pi C - 2r_1)^2 + 4(LC - 2C^2 - \pi r_1 C - r_1^2)}}{2}$$

$$V_{B1} = r_1 N_E(\pi/30) / R_{GI}$$

$$V_{B2} = r_2 N_G(\pi/30) / R_{GO}$$

$\alpha$—pulley groove angle, deg
C—pulley center distance, in
L—belt length, in
$N_E$—engine speed, rpm $N_G$—generator speed, rpm
$r_1$—primary pulley pitch radius, in
$r_2$—secondary pulley pitch radius, in
$R_{GI}$—engine side gear ratio
$R_{GO}$—generator side gear ratio
$V_{B1}$—estimated belt speed at primary sheave, in/sec
$V_{B2}$—estimated belt speed at secondary sheave, in/sec
$Y_1$—primary sheave actuator linear displacement, in The calculations and control of the switching between control loop 15 and control loop 66 is performed by microprocessor 19.

While only a preferred embodiment of the invention has been disclosed herein, it is apparent that various modifications and alterations of the invention may be made. For example, instead of calculating the primary and secondary pulley pitch radii from a measurement of primary sheave actuator linear displacement, these radii could be directly measured. It is therefore the intention in the appended claims to cover all such modifications and alterations as may fall within the spirit and scope of the invention.

We claim:

1. A continuously variable transmission for transferring drive from an engine to a device to be driven, said transmission comprising a primary pulley for receiving drive from an engine, a belt, a secondary pulley which is coupled over said belt to the primary pulley for transferring drive to a device to be driven, said primary and secondary pulleys each having an axially movable sheave and a hydraulically operated actuator therefor to effect ratio change of the transmission and to maintain belt tension, means for detecting a condition of belt slipping in the transmission and means for adjusting the transmission ratio to recover from belt slipping further comprising an output speed control loop for controlling the output speed at said transmission driving said device to be driven during normal operation of said transmission and wherein said means for detecting and said means for adjusting include a belt speed matching control loop for adjusting the transmission ratio when a condition of belt slipping is detected to recover from belt slipping.

2. The transmission according to claim 1, wherein a single source of constant hydraulic pressure is operatively connected to said actuator of said primary pulley by way of a ratio control valve and is operatively connected to said actuator of said secondary pulley by way of a pressure control valve.

3. The transmission according to claim 1, wherein said output speed control loop may be set to control said output speed at a constant value during normal operation of the transmission.

4. The transmission according to claim 1, in combination with an electric generator as said device to be driven.

5. The transmission according to claim 1, further comprising a hydraulic pressure control loop for controlling the hydraulic pressure applied to the actuator of said secondary pulley as a function of the load of said device to be driven on said transmission and the pulley pitch radius of said secondary pulley.

6. The transmission according to claim 5, wherein said device to be driven is an electric generator and said hydraulic pressure control loop measures the load current of said generator for calculation of a load torque of said generator on said transmission.

7. The transmission according to claim 5, wherein said hydraulic pressure control loop measures a load torque on an output shaft of said secondary pulley driving said device to be driven.

8. The transmission according to claim 5, wherein said hydraulic pressure control loop includes a hydraulic pressure control valve operatively connected between a single source of constant hydraulic pressure and said actuator of said secondary pulley.

9. The transmission according to claim 1, wherein said means for detecting a condition of belt slipping estimates belt speeds of the primary and secondary sheaves and compares the two estimated belt speeds, a condition of belt slipping being indicated when a difference between said two estimated belt speeds exceeds a first predetermined threshold value.

10. The transmission according to claim 9, wherein said means for adjusting the transmission ratio to recover from belt slipping reduces the difference between said two estimated belt speeds to less than a second predetermined threshold value.

11. The transmission according to claim 9, wherein said means for detecting measures the primary sheave linear displacement, engine speed and speed of said device to be driven, and calculates the primary pulley pitch radius and the secondary pitch radius for estimating the belt speeds at the two sheaves.

12. The transmission according to claim 11, wherein said means for detecting calculates the estimated belt speed at the primary sheave as a function of the calculated primary pulley pitch radius, the measured engine speed, and an engine side gear ratio and the estimated belt speed at the secondary sheave is calculated as a function of the calculated secondary pulley pitch radius, the measured speed of the device to be driven, and a device-to-be-driven side gear ratio.

13. A continuously variable transmission for transferring drive from an engine to a device to be driven, said transmission comprising a primary pulley for receiving drive from an engine, a belt, a secondary pulley which is coupled over said belt to the primary pulley for transferring drive to a device to be driven, said primary and secondary pulleys each having an axially movable sheave and a hydraulically operated actuator therefor to effect ratio change of the transmission and to maintain belt tension, a hydraulic pressure control loop for controlling the hydraulic pressure applied to the actuator of said secondary pulley as a function of the load of said device to be driven on said transmission and the pitch radius of the secondary pulley, an output speed control loop for controlling the output speed of said transmission driving said device to be driven during normal operation, and a belt speed matching loop which overrides said output speed control loop for adjusting the transmission ratio when a condition of belt slipping occurs to recover from belt slipping.

14. The transmission according to claim 13, further comprising a single source of constant hydraulic pressure operatively connected for driving each of said actuators, said source of constant hydraulic pressure comprising a hydraulic pump and a pressure relief valve in communication with the output of said hydraulic pump to maintain a predetermined hydraulic output pressure of the pump.

15. The transmission according to claim 13, wherein said output speed control loop may be set to control said output speed at a constant value.

16. The transmission according to claim 13, in combination with an electric generator as said device to be driven.

17. The transmission according to claim 16, wherein said hydraulic pressure control loop measures the load current of said generator for calculation of a load torque of said generator on said transmission.

18. The transmission according to claim 13, wherein said hydraulic pressure control loop measures a load torque on an output shaft of said secondary pulley driving said device to be driven.

19. A method of recovering from belt slippage after the belt starts slipping in a continuously variable transmission for transferring drive from an engine to a device to be driven under varying load conditions, wherein said transmission comprises a primary pulley for receiving drive from an engine, a belt, a secondary pulley coupled over said belt to the primary pulley for transferring drive to a device to be driven, said primary and secondary pulleys each having an axially movable sheave and a hydraulically operated actuator therefor to effect ratio change of the transmission and to maintain belt tension, a hydraulic pressure control loop for controlling the hydraulic pressure applied to the actuator of said secondary pulley as a function of the sensed load of said device to be driven on said transmission and the pitch radius of the secondary pulley, and an output speed control loop for controlling the hydraulic pressure applied to the actuator of said primary pulley and thereby the output speed of said transmission driving said device to be driven, said method comprising detecting a condition of belt slipping in the transmission and adjusting the transmission ratio to recover from belt slipping.

20. The method according to claim 19, when said device is an electric generator which is driven at a constant speed by said engine and transmission.

21. The method according to claim 19, wherein said detecting a condition of belt slipping includes estimating belt speeds at the primary and secondary sheaves and comparing the two estimated belt speeds, a condition of belt slipping being indicated when a difference between said two estimated belt speeds exceeds a first predetermined threshold value.

22. The method according to claim 21, wherein said step of adjusting the transmission ratio to recover from belt slipping is performed until said difference between said two estimated belt speeds is less than a second predetermined threshold value.

23. The method according to claim 21, including measuring the primary sheave linear displacement, engine speed and speed of said device to be driven, and calculating the primary pulley pitch radius and the secondary pulley pitch radius for estimating the belt speeds at the two sheaves.

24. The method according to claim 23, wherein the estimated belt speed of the primary sheave is calculated as a function of the calculated primary pulley pitch radius, the measured engine speed, and an engine side gear ratio, and the estimated belt speed of the secondary sheave is calculated as a function of the calculated secondary pulley pitch radius, the measured speed of the device to be driven, and a device-to-be-driven side gear ratio.

25. The method according to claim 19, wherein said transmission further comprises a belt speed matching loop for adjusting the transmission ratio to recover from belt slipping, and wherein said step of adjusting the transmission ratio to recover from belt slipping includes switching on said belt speed matching control loop and overriding said output speed control loop.

* * * * *